United States Patent
Wen et al.

(10) Patent No.: US 10,338,188 B2
(45) Date of Patent: Jul. 2, 2019

(54) LOCATION ASSISTANCE WITH A DYNAMICALLY UPDATED BEACON PAYLOAD FROM AN ELECTRONIC DEVICE

(71) Applicant: Microsoft Technology Licensing, LLC, Redmond, WA (US)

(72) Inventors: Heming Wen, Bellevue, WA (US); Frank Gorgenyi, Bremerton, WA (US); Alain L. Michaud, Boischatel (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/630,894

(22) Filed: Jun. 22, 2017

(65) Prior Publication Data

US 2018/0372833 A1     Dec. 27, 2018

(51) Int. Cl.
| | |
|---|---|
| G01S 5/02 | (2010.01) |
| H04W 4/02 | (2018.01) |
| G01S 19/06 | (2010.01) |
| G01S 19/01 | (2010.01) |

(52) U.S. Cl.
CPC ............ G01S 5/0231 (2013.01); G01S 19/01 (2013.01); G01S 19/06 (2013.01); H04W 4/02 (2013.01)

(58) Field of Classification Search
CPC ......... G01S 5/0231; G01S 19/01; H04W 4/02
See application file for complete search history.

(56) References Cited

U.S. PATENT DOCUMENTS

| | | | |
|---|---|---|---|
| 9,094,816 B2 | 7/2015 | Maier et al. | |
| 9,426,304 B2 | 8/2016 | Biage et al. | |
| 9,509,842 B2 | 11/2016 | Estrada et al. | |
| 2003/0060214 A1* | 3/2003 | Hendrey | H04W 4/02 455/456.3 |
| 2004/0239498 A1 | 12/2004 | Miller | |
| 2010/0152550 A1* | 6/2010 | Doerr | A61N 1/37217 600/301 |
| 2012/0208492 A1* | 8/2012 | Tschofenig | H04M 3/5116 455/404.2 |
| 2013/0143529 A1* | 6/2013 | Leppanen | H04W 4/08 455/411 |
| 2013/0242847 A1* | 9/2013 | Oh | H04L 1/0041 370/312 |

(Continued)

OTHER PUBLICATIONS

"Cisco Collaboration System 10.x Solution Reference Network Designs (SRND)", http://www.cisco.com/c/en/us/td/docs/voice_ip_comm/cucm/srnd/collab10/collab10/e911.html, Retrieved on: Apr. 4, 2017, 25 pages.

(Continued)

Primary Examiner — Christopher M Brandt

(57) ABSTRACT

Electronic devices described herein are configured to use a beaconing capability to enable responders to locate a user of the electronic device. The beacon payload includes an incident identifier, among other data, that enables responders to identify the specific electronic device that was used to place the emergency call. The beacon payload is dynamically updated with refreshed data to enable responders to locate the user of the electronic device that may potentially be in transit from one location to another, and to adapt to changing circumstances associated with the emergency situation.

20 Claims, 6 Drawing Sheets

(56) References Cited

U.S. PATENT DOCUMENTS

| | | | | |
|---|---|---|---|---|
| 2013/0303104 A1* | 11/2013 | Venkatachalam | ....... | H04W 4/90 |
| | | | | 455/404.1 |
| 2014/0162618 A1* | 6/2014 | Mohr | .................. | H04W 48/02 |
| | | | | 455/418 |
| 2015/0118987 A1* | 4/2015 | Deason | .................. | H04W 4/90 |
| | | | | 455/404.1 |
| 2017/0072851 A1* | 3/2017 | Shenoy | ................. | B60Q 9/008 |
| 2017/0113640 A1* | 4/2017 | Newlands | ................ | B60Q 9/00 |
| 2018/0124584 A1* | 5/2018 | Venkatraman | ........ | H04W 76/15 |

OTHER PUBLICATIONS

"Plan for emergency services in Skype for Business Server 2015", http://web.archive.org/web/20170214134741/https:/technet.microsoft.com/en-us/library/dn951423.aspx, Feb. 14, 2017, 6 pages.

\* cited by examiner

LOCATION ASSISTANCE WITH A DYNAMICALLY UPDATED BEACON PAYLOAD FROM AN ELECTRONIC DEVICE

BACKGROUND

An increasing number of e911 calls are being placed from mobile devices by individuals seeking assistance with emergency situations. The location of the cell tower directing the e911 call may provide a general indication of the location of the caller. Emergency personnel typically obtain location information orally from the caller during the e911 call, or from information available from the telephone company about the mobile phone's signal location if available. With the advent of "beaconing" capabilities using BLUETOOTH® and Wi-Fi, many mobile devices have the capability to broadcast a beacon. In some cases, responders use the detected signal strength of the beacon to determine the location of the mobile device.

However, mobile devices may potentially be in transit during an emergency as the caller moves from one location to another. Further, in a mass casualty event, it may be difficult for responders to distinguish between multiple beacons generated by different mobile devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method comprises detecting a request to contact an emergency service; obtaining an incident identifier; obtaining location information of a mobile device; generating a beacon payload including the incident identifier and other data; enabling beaconing, at the mobile device, to transmit the generated beacon payload to enable a responder to locate the mobile device; and dynamically updating the beacon payload for the enabled beaconing with refreshed data.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

In FIGS. 1-6, the systems are illustrated as schematic drawings. The drawings may not be to scale. Corresponding reference characters indicate corresponding parts throughout the drawings.

DETAILED DESCRIPTION

Figure 1:
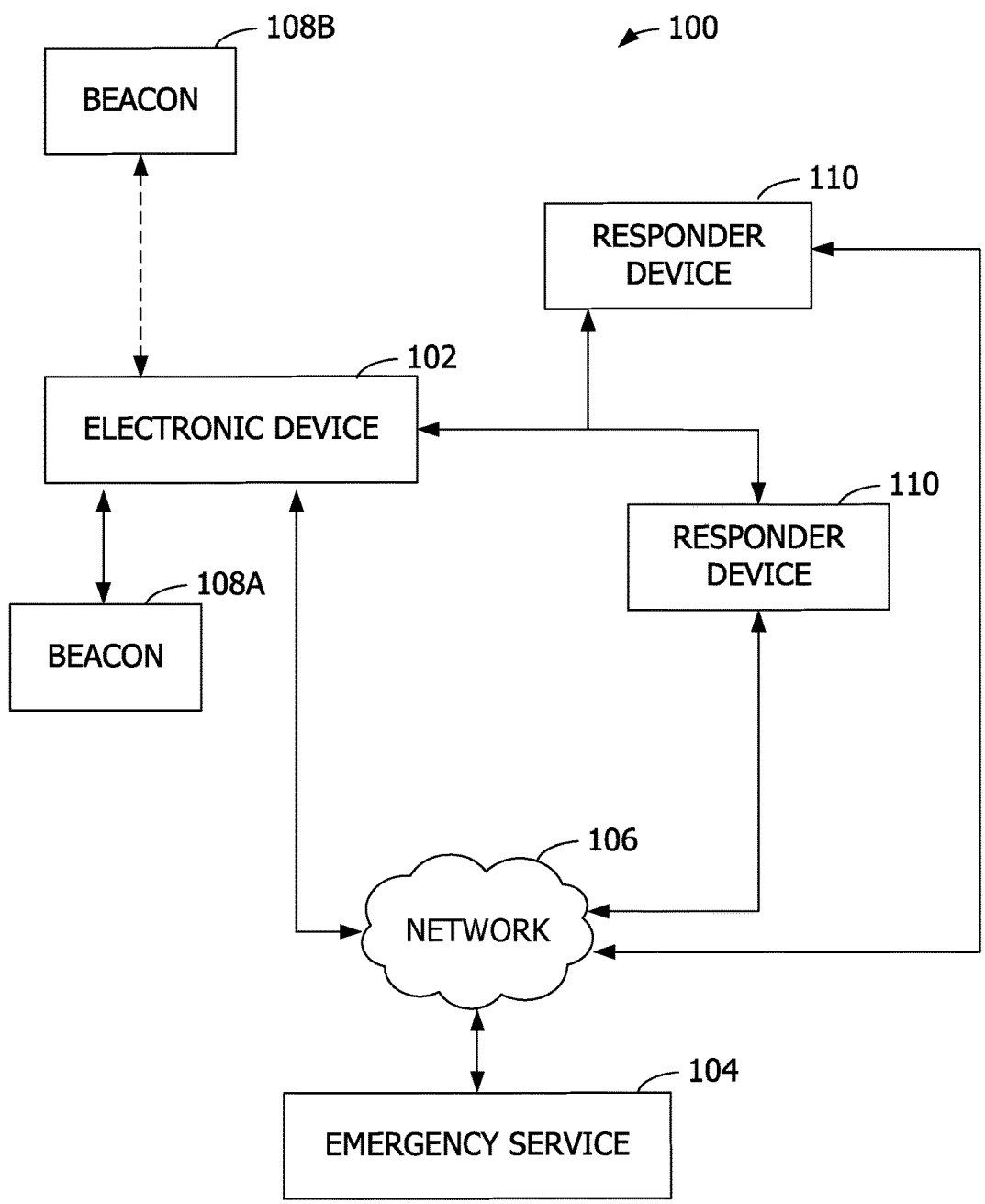
FIG. 1 illustrates a block diagram representation of an exemplary operating environment for an electronic device.

The electronic devices described herein are configured to enhance the experience of a user of an electronic device facing an emergency situation by using a beaconing capability of the electronic device to enable responders to locate the electronic device. A beacon payload includes an incident identifier that enables responders to identify the specific electronic device that was used to place the emergency call. The user of the electronic device is provided with the option of selecting the information that is included in the beacon payload. If the user consents, additional information that may help responders identify and locate the individual may be included in the beacon payload, such as a phone number of the electronic device, a last known location of the electronic device, a type of emergency, and/or any other information known by the electronic device. The beacon payload is broadcast for detection by responders. The beacon payload is updated dynamically, periodically, intermittently, or otherwise with refreshed data from the electronic device, and the updated beacon payload is used during the broadcast. Examples of the refreshed data include, but are not limited to, a dynamically updated location of the electronic device, and a dynamically updated emergency type identifier associated with the type of emergency. By beaconing the dynamically refreshed beacon payload having updated information regarding the location of the electronic device, responders are able to locate the electronic device, and therefore the user, even if the electronic device is in transit from one location to another. Updating the emergency type identifier enables responders to adapt to changing circumstances associated with the emergency situation.

The detailed description provided below in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

The terms 'computer', 'computing apparatus', 'mobile device,' 'electronic device,' and the like are used herein to refer to any device with processing capability such that it can execute instructions. Those skilled in the art will realize that such processing capabilities are incorporated into many different devices and therefore the terms 'computer' and 'computing apparatus' each may include PCs, servers, laptop computers, mobile telephones (including smart phones), tablet computers, media players, games consoles, personal digital assistants, and many other devices.

Referring to FIG. 1, a block diagram representation of an exemplary operating environment 100 for an embodiment of an electronic device 102 is shown. A user typically contacts an emergency service 104 using an electronic device 102 when faced with an emergency situation. The emergency call placed using the electronic device 102 is connected to the emergency service 104 via a network 106. In an example, the emergency call placed using the electronic device 102 may be connected to the emergency service 104 via a cellular network. In an example, the emergency call placed using the electronic device 102 may be a Wi-Fi call that is connected to the emergency service 104 via a Wi-Fi network. Examples of the electronic device 102 include, but are not limited to, PCs, servers, laptop computers, mobile telephones (including smart phones), tablet computers, media players, games consoles, and, personal digital assistants. An example of an emergency service 104 is an e911 emergency service.

When the user of the electronic device places the call to the emergency service 104 using the electronic device 102, the electronic device 102 detects a request to contact the emergency service 104. The electronic device 102 recognizes the phone number being dialed by the user to contact the emergency service 104 as a phone number associated with the emergency service 104.

The electronic device 102 obtains an incident identifier in response to the placement of the emergency call. The incident identifier is associated with the emergency call. The electronic device 102 stores the incident identifier at the electronic device 102.

In an example, the incident identifier may be generated by the electronic device 102 when the electronic device 102 detects that the emergency call has been placed to the emergency service 104. The electronic device 102 stores the generated incident identifier at the electronic device 102 and transmits the generated incident identifier to the emergency service 104.

In an example, the incident identifier may be generated by the emergency service 104 upon receipt of the emergency call from the electronic device 102. Emergency personnel at the emergency service 104 assess whether the emergency call received from the electronic device 102 is associated with a legitimate emergency situation. If the emergency personnel determine that the received call is associated with a legitimate emergency situation, the emergency personnel assign an incident identifier to the emergency call. The emergency service 104 transmits the assigned incident identifier to the electronic device 102. The electronic device 102 stores the received incident identifier at the electronic device 102.

In an example, when the emergency call is placed via a cellular network, the incident identifier may be generated by a component of the cellular network infrastructure. The component of the cellular network infrastructure determines whether the call placed by the electronic device 102 is to the emergency service 104. If the component of the cellular network infrastructure determines that the received call is to the emergency service 104, the component of the cellular network infrastructure assigns an incident identifier to the emergency call. The component of the cellular network infrastructure forwards the incident identifier with the emergency call to the emergency service 104. Emergency personnel at the emergency service 104 assess whether the emergency call received from the electronic device 102 is associated with a legitimate emergency situation. If the emergency personnel determine that the received call is associated with a legitimate emergency situation, the emergency service 104 transmits the incident identifier received from the component of the cellular network infrastructure to the electronic device 102. The electronic device 102 stores the received incident identifier at the electronic device 102. Alternatively, the component of the cellular network infrastructure transmits the generated incident identifier to both the emergency service 104 and to the electronic device 102. Examples of components of the cellular infrastructure include cellular towers, switches, and geographic information (GIS) software. The incident identifier transmitted by the component of the cellular network infrastructure is received at the electronic device 102. The electronic device 102 stores the received incident identifier at the electronic device 102.

In an example, when the emergency call is placed via a Wi-Fi network, the incident identifier may be generated by a Session Initiation Protocol (SIP) server. The SIP server determines whether the call placed by the electronic device 102 is to the emergency service 104. If the SIP server determines that the call is to the emergency service 104, the SIP server assigns an incident identifier to the emergency call. The SIP server forwards the incident identifier to the emergency service 104. Emergency personnel at the emergency service 104 assess whether the emergency call received from the electronic device 102 is associated with a legitimate emergency situation. If the emergency personnel determine that the received call is associated with a legitimate emergency situation, the emergency service 104 transmits the incident identifier received from the SIP server to the electronic device 102. The electronic device 102 stores the received incident identifier at the electronic device 102. Alternatively, the SIP server transmits the generated incident identifier to both the emergency service 104 and to the electronic device 102. The incident identifier transmitted by the SIP server is received at the electronic device 102. The electronic device 102 stores the received incident identifier at the electronic device 102.

The incident identifier or other token identifies the electronic device 102 and may take the form of a globally or locally unique identifier. Examples include a mobile identification number such as the international mobile equipment identity (IMEI) or mobile equipment identifier (MEID). The incident identifier enables the electronic device 102 to be distinguished from other devices.

The electronic device 102 obtains location information that specifies the location of the electronic device 102 from one or more sources. The electronic device 102 stores the location information at the electronic device 102 and periodically updates the stored location information with updated location information received from the one or more sources. Examples of location information include, but are not limited to, latitude information of the electronic device 102, longitude information of the electronic device 102, and altitude information of the electronic device 102. In an example, the electronic device 102 may obtain location information from a global positioning system (GPS) of the electronic device 102. The electronic device 102 periodically receives updated location information from the GPS and stores the updated location information at the electronic device 102. This enables the electronic device 102 to maintain the most recently detected location of the electronic device 102.

In an example, the electronic device 102 may obtain location information from one or more neighboring beaconing devices 108A, 108B. Beaconing devices 108A, 108B are often positioned throughout different locations of an area. For example, a number of beaconing devices 108A, 108B may be positioned throughout a building. Each of the beaconing devices 108A, 108B transmits the location of that beaconing device 108A, 108B as a part of the beaconing device payload. For example, the beaconing devices 108A, 108B may transmit the floor that the beaconing device 108A, 108B is located on as a component of the beaconing device payload. The electronic device 102 receives the beaconing device payload from one or more neighboring beaconing devices 108A, 108B and interprets the neighboring beaconing device payload to determine the location of the electronic device 102 within the building. If the user of the electronic device 102 moves, the electronic device 102 receives the beaconing device payload from one or more neighboring beaconing devices 108A, 108B in the new location and stores the updated location information at the electronic device 102 to determine the new location of the electronic device 102. The neighboring beaconing device location information may be used to supplement the location information provided by the GPS of the electronic device 102. While two beaconing devices 108A, 108B are shown, a fewer or greater number of beaconing devices may be located in an area.

The electronic device 102 may maintain a list of neighboring beaconing devices 108A, 108B in the area (e.g., detectable or otherwise proximate to the electronic device 102). The electronic device 102 provides the list of neighboring beaconing devices 108A, 108B in response to an interrogation from another device such as a responder device 110. The interrogating device identifies the locations associated with the list of neighboring beaconing devices 108A, 108B to determine the location of the electronic device 102. The information retrieved by the interrogating device assists the responders in their efforts to locate the user of the electronic device. The list of neighboring beaconing devices 108A, 108B detected by the electronic device 102 is updated by the electronic device 102 at new locations on a periodic basis so that any movement of the electronic device may be tracked.

The electronic device 102 generates a beacon payload. The beacon payload includes the incident identifier associated with the emergency call. The beacon payload also includes other data. In an example, the electronic device 102 may include the location of the electronic device 102 in the beacon payload. In an example, the electronic device 102 retrieves the location information of the electronic device 102 that is stored at the electronic device 102 and includes the retrieved location information in the beacon payload.

The electronic device 102 may encrypt the retrieved location information and/or other data to be stored in the beacon payload, and include the encrypted location information in the beacon payload. Encryption of the location information and/or other data in the beacon payload may protect the identity and location of the user of the electronic device from malicious individuals. An example of a malicious individual may be a stalker. Encryption may occur using keys exchanged during the emergency call, or using keys obtained during subscriber identity module (SIM) insertion into the electronic device 102. For example, the keys may be installed on the electronic device 102 by a carrier during provisioning of the electronic device 102 (e.g., in response to activating or enabling the SIM on the electronic device 102).

In an example, the electronic device 102 may include the phone number associated with the electronic device 102 in the beacon payload. The phone number associated with the electronic device 102 is stored at the electronic device 102. The electronic device 102 retrieves the stored phone number and includes the retrieved phone number in the beacon payload.

In an example, the electronic device 102 may include an emergency type identifier in the beacon payload. The emergency type identifier may be assigned at the emergency service 104 following the assessment of the emergency situation by emergency personnel. The emergency service 104 transmits the emergency type identifier to the electronic device 102. The electronic device 102 stores the received emergency type identifier at the electronic device 102. The electronic device 102 retrieves the stored emergency type identifier and includes the retrieved emergency type identifier in the beacon payload. Examples of the emergency type include, but are not limited to, fire, medical, police, terrorism, etc.

The electronic device 102 enables beaconing at the electronic device 102 and broadcasts the generated beacon payload to enable the responders to locate the user of the electronic device by locating the electronic device 102. The beacon payload broadcast by the electronic device 102 is received by one or more responder devices 110. The responders rely on the information received at their responder devices 110 to locate the electronic device 102. For example, the electronic device 102 may broadcast the beacon payload at 100 millisecond intervals. The electronic device 102 may, however, broadcast the beacon payload at other time period intervals.

The electronic device 102 increases the transmission power associated with broadcasting of the generated beacon payload. The electronic device 102 may increase the transmission power to enable the broadcasting of the generated beacon payload at a relatively or absolutely higher signal strength than the signal strength used to broadcast routine communications from the electronic device 102. For example, the transmission may go to the maximum power capable by the electronic device 102.

In an example, the electronic device 102 disables the broadcasting of other beacon payloads from the electronic device 102. The electronic device 102 broadcasts the generated beacon payload using the frequency channels that are available for beaconing, including the frequency channels that were being used by the disabled beacon payloads to transmit the generated beacon payload.

In an example, the electronic device 102 uses BLUETOOTH® advertisement frequency channels to broadcast the generated beacon payload. The electronic device 102 disables the use of other BLUETOOTH® advertisement frequency channels to broadcast other beacon payloads. The payload size in this BLUETOOTH® example is less than 31 bytes.

In an example, the electronic device 102 uses Wi-Fi to broadcast the generated beacon payload. The electronic device 102 disables the use of other Wi-Fi frequency channels in a connection with other Wi-Fi communications including those Wi-Fi frequency channels that may be engaged in the broadcasting of other beacon payloads. The electronic device 102 uses the available Wi-Fi frequency channels to broadcast the generated beacon payload.

In an example, the electronic device 102 uses ultrasound to broadcast the generated beacon payload. The electronic device 102 disables the use of other ultrasound frequency channels in a connection with other ultrasound communications including those ultrasound frequency channels that may be engaged in the broadcasting of other beacon payloads. The electronic device 102 uses the available ultrasound frequency channels to broadcast the generated beacon payload.

The electronic device 102 dynamically updates the beacon payload for the enabled beaconing with data refreshed by the electronic device 102 (e.g., obtained via sensors accessible to the electronic device 102). In an example, the electronic device 102 updates the beacon payload with refreshed location information. As mentioned previously, the electronic device 102 stores the location information of the electronic device 102 at the electronic device 102 and periodically updates the stored location information. The electronic device 102 periodically retrieves the stored location information and updates the beacon payload with the retrieved location information. The beaconing of the beacon payload with dynamically updated location information by the electronic device 102 enables the responders to track the movement of the electronic device.

In an example, the electronic device 102 updates the beacon payload with a refreshed emergency type identifier. The emergency service 104 may update the emergency type identifier if the emergency personnel determine that the nature of the emergency situation has changed. For example, the initial emergency type may have been determined by the emergency personnel at the emergency service 104 to be related to a fire. The emergency service 104 would have initially transmitted the emergency type identifier associated with a fire to the electronic device 102, and informed responders that are equipped to handle fire related emergencies to respond to the emergency situation. The electronic device 102 would have included the emergency type identifier associated with a fire in the beacon payload. Upon the progression of the emergency situation, emergency personnel may determine that the fire was set by an intruder to facilitate a theft. The emergency personnel may update the emergency type identifier to reflect that the emergency situation has changed to a combination of a fire and a theft and inform responders that are equipped to handle an emergency related to a theft to also respond to the emergency situation. The emergency service 104 may transmit the updated emergency type identifier to the electronic device 102. The electronic device 102 stores the received updated emergency type identifier at the electronic device 102. The electronic device 102 retrieves the stored emergency type identifier and updates the beacon payload with the retrieved emergency type identifier.

In an example, the electronic device 102 generates a user interface that provides the user of the electronic device 102 with an option of excluding the location information from the beacon payload. If the user excludes the location information, the responders rely on responder devices 110 to detect increasing signal strength of the beaconing by the electronic device 102, or other location determination means, as the responders approach the electronic device 102 to locate the user of the electronic device.

Alternatively or in addition, the user interface provides the user of the electronic device with the option of cancelling the broadcasting of the beaconing payload associated with the emergency situation by the electronic device 102. For example, the user of the electronic device 102 may wish to cancel the broadcasting of the beacon payload by the electronic device 102 upon the conclusion of the emergency situation, or in the event the user inadvertently contacted the emergency service 104 using the electronic device 102.

Aspects of the disclosure are also operable with mesh networks. For example, electronic device 102 may join a mesh network. This enables other devices in the mesh network to receive the beacon including the beacon payload being broadcast by the electronic device 102. In an example, the devices within the mesh network broadcast the beacon payload received from the electronic device 102 to another device in the mesh network. The devices within the mesh network that receive the beacon payload being broadcast by the electronic device 102 re-broadcast the received beacon payload as a beacon. Responder devices 110 pick up the beacons being re-broadcast by various devices in the mesh network, where the beacons include the beacon payload originally generated by the electronic device 102.

Figure 2:
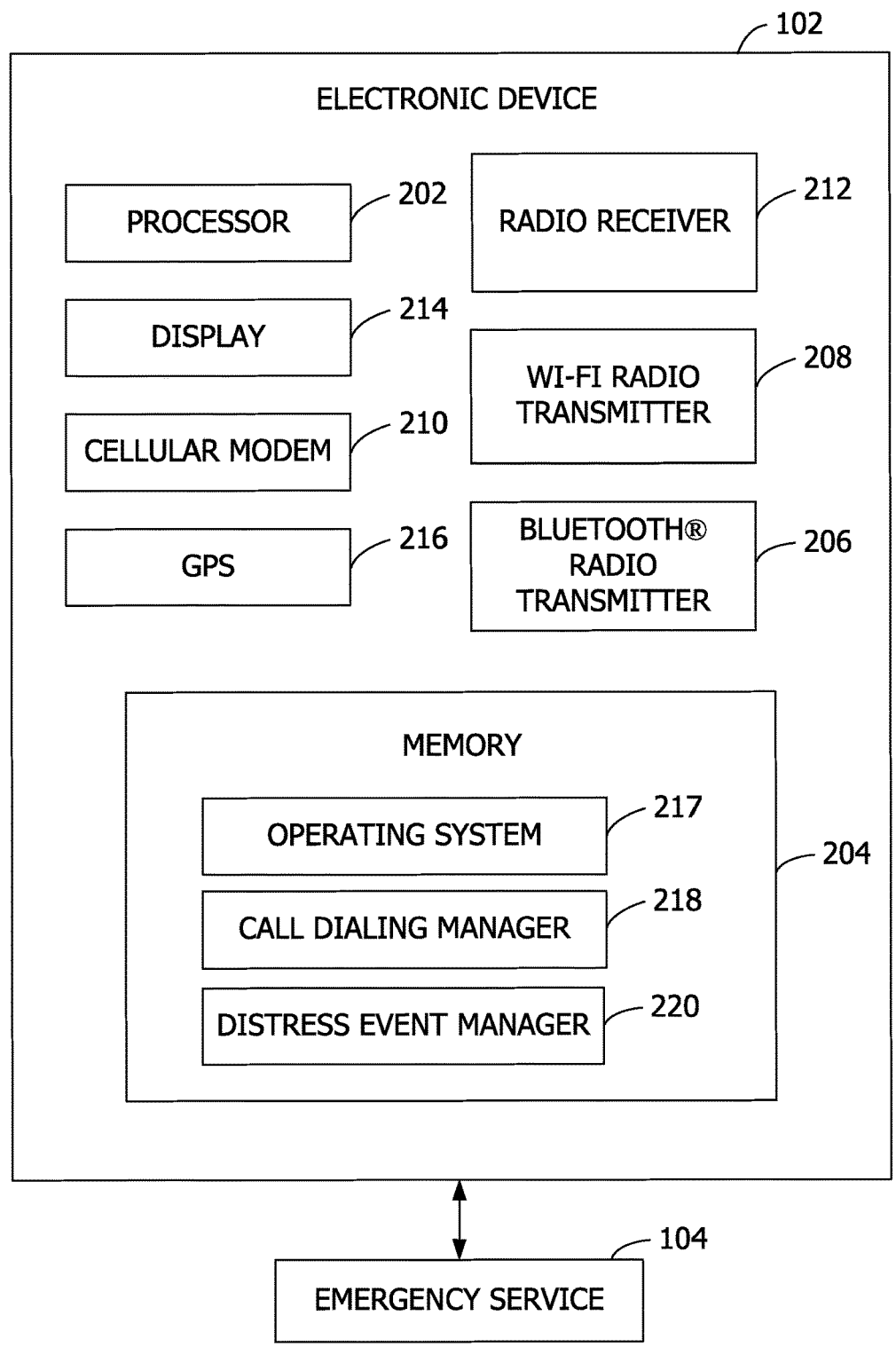
FIG. 2 illustrates a block diagram representation of an embodiment of the electronic device.

Referring to FIG. 2, a block diagram representation of an embodiment of an electronic device 102 is shown. In an example, the electronic device 102 may be a mobile device. The electronic device 102 includes a processor 202 communicatively coupled to memory 204, a BLUETOOTH® radio transmitter 206, a Wi-Fi radio transmitter 208, a cellular modem 210, a radio receiver 212, a display 214 and a GPS 216. The memory 204 stores an operating system 217, a call dialing manager 218, and a distress event manager 220. The memory 204 includes computer program code. The memory 204 and the computer program code are configured to, with the processor 202, to cause the electronic device 102 to perform a number of different functions as described herein.

When a call to the emergency service 104 is placed using the electronic device 102, the call dialing manager 218 detects the request to contact the emergency service 104. The call dialing manager 218 detects the request by, for example, recognizing that the phone number dialed using the electronic device 102 is associated with the emergency service 104 and informs the operating system 217 that a call has been placed to the emergency service 104. The operating system 217 informs the distress event manager 220 that a call has been placed to the emergency service 104. The distress event manager 220 initiates the process associated with broadcasting a beacon including the beacon payload associated with the emergency situation from the electronic device 102. The distress event manager 220 may also generate a user interface for display on the display 214. The user interface provides the user of the electronic device with the option to cancel the broadcasting of the beacon payload associated with the emergency situation from the electronic device 102 at any time following the placement of the emergency call, monitor the broadcasting, and/or alter the broadcasting.

The electronic device 102 obtains the incident identifier. In an example, the incident identifier is generated by the distress event manager 220. The processor 202 stores the incident identifier generated by the distress event manager 220 in the memory 204. The call dialing manager 218 retrieves the incident identifier from the memory 204 and incorporates the incident identifier into the call placed from the electronic device 102 to the emergency service 104.

The processor 202 energizes the cellular modem to transmit the emergency call to the emergency service 104 via the cellular network. If the incident identifier was not generated by the distress event manager 220, the emergency service 104 generates the incident identifier upon receiving the emergency call from the electronic device 102 and transmits the incident identifier to the electronic device 102. The incident identifier is received at the cellular modem 210. The processor 202 stores the received incident identifier in the memory 204.

In another example, a component of the cellular network infrastructure receives or detects the emergency call and generates an incident identifier. The component of the cellular network infrastructure incorporates the incident identifier into the call to the emergency service 104. The emergency service 104 transmits the received incident identifier to the electronic device 102. The incident identifier transmitted from the emergency service 104 is received at the cellular modem 210. The processor 202 stores the received incident identifier in the memory 204. Alternatively, the component of the cellular network infrastructure transmits the generated incident identifier to both the emergency service 104 and the electronic device 102. The incident identifier transmitted by the component of the cellular network infrastructure is received at the cellular modem 210. The processor 202 stores the received incident identifier in the memory 204.

In an example, the processor 202 routes the emergency call to the Wi-Fi radio transmitter 208 for transmission to the emergency service 104 via the SIP server. The SIP server detects the request to place the emergency call and, if the incident identifier has not been generated yet, generates the incident identifier. The SIP server incorporates the incident identifier into the call to the emergency service 104. The emergency service 104 transmits the received incident identifier to the electronic device 102 if needed. The incident identifier transmitted from the emergency service 104 is received at the cellular modem 210. The processor 202 stores the received incident identifier in the memory 204. Alternatively, the SIP server transmits the generated incident identifier to both the emergency service 104 and the electronic device 102. The incident identifier transmitted by the SIP server is received at the radio receiver 212. The processor 202 stores the received incident identifier in the memory 204.

The distress event manager 220 generates the beacon payload. The distress event manager 220 retrieves the incident identifier from the memory 204 and includes the retrieved incident identifier in the beacon payload. The distress event manager 220 may include other data in the beacon payload, such as described elsewhere herein.

The distress event manager 220 enables beaconing to broadcast the generated beacon payload from the electronic device 102 to enable a responder to locate the user of electronic device using a responder device 110. In an example, the distress event manager 220 enables beaconing via the BLUETOOTH® radio transmitter 206.

In an example, the distress event manager 220 enables the Wi-Fi radio transmitter 208 to broadcast the generated beacon payload from the electronic device 102 to enable a responder to locate the user of electronic device using a responder device 110. The distress event manager 220 increases the transmission power supplied to the Wi-Fi radio transmitter 208 to enable the Wi-Fi radio transmitter 208 to broadcast the beacon payload at a relatively higher signal strength than the signal strength used to transmit routine communications via the Wi-Fi radio transmitter 208.

The distress event manager 220 dynamically updates the beacon payload for the enabled beaconing with refreshed data, such as refreshed location information and a refreshed emergency type identifier as described herein.

Figure 3:
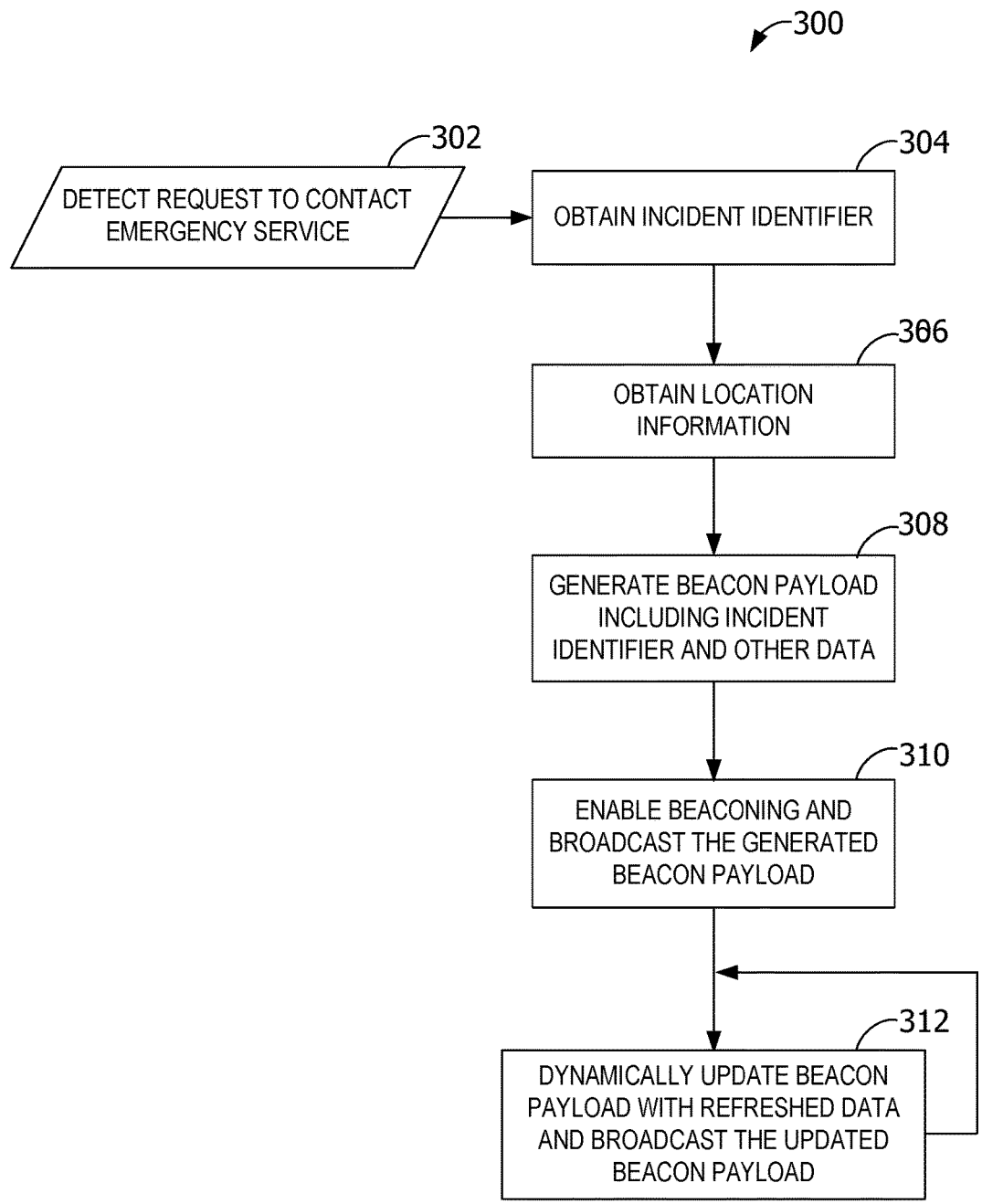
FIG. 3 illustrates a flow chart representation of an exemplary method of broadcasting a dynamically updated beacon payload from the electronic device.

Referring to FIG. 3 an illustration of a flow chart representation of an exemplary method 300 of broadcasting a dynamically updated beacon payload from an embodiment of the electronic device 102 is shown. At 302, a request is detected to contact the emergency service 104. The request is detected by the electronic device 102. In an example, the electronic device 102 is a mobile device.

At 304, an incident identifier is obtained. The incident identifier is obtained by the electronic device 102, such as a mobile device. The incident identifier may be generated by the electronic device 102, by the emergency service 104 and transmitted to the electronic device 102, by a component of the cellular network infrastructure, or by a SIP server.

At 306, location information is obtained. The location information is obtained by the electronic device 102, such as through the GPS 216 and/or one or more neighboring beaconing devices 108A, 108B.

At 308, a beacon payload is generated including the incident identifier and other data. The beacon payload is generated at the electronic device 102, and includes the location information of the electronic device 102, the phone number of the electronic device 102, and/or the emergency type identifier.

At 310, beaconing is enabled to broadcast the generated beacon payload. The beaconing is enabled to broadcast the generated beacon payload from the electronic device 102 to enable the responder to locate the electronic device 102. At 312, the beacon payload for the enabled beaconing is dynamically updated by the electronic device 102 with refreshed data, such as refreshed location information and/or a refreshed emergency type identifier.

Figure 4:
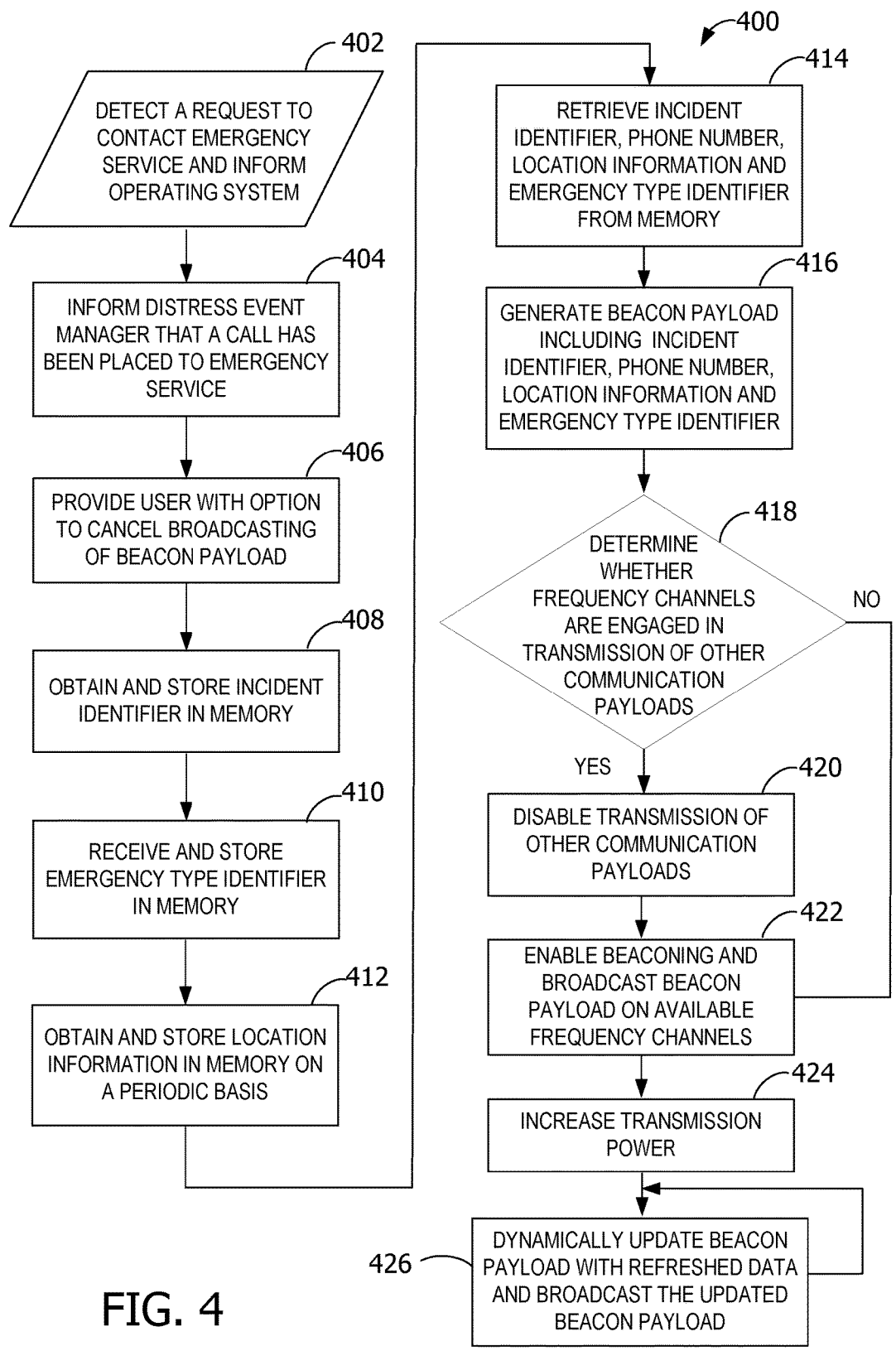
FIG. 4 illustrates a flow chart representation of an exemplary method of broadcasting a dynamically updated beacon payload from the electronic device.

Referring to FIG. 4, a flow chart representation of an exemplary method 400 of an embodiment of the electronic device 102 is shown. At 402, the call dialing manager 218 at the electronic device 102 detects a request is to contact the emergency service 104 and informs the operating system 217 that a call has been placed to the emergency service 104. At 404, the operating system 217 informs the distress event manager 220 that a call has been placed to the emergency service 104. At 406, distress event manager 220 transmits a user interface to the display 214 that provides the user with the option to cancel the broadcasting of the beacon payload associated with the emergency call.

At 408, the processor 202 obtains the incident identifier and stores the incident identifier in the memory 204.

At 410, the processor receives the emergency type identifier from the emergency service 104 and stores the received emergency type identifier in the memory 204. At 412, the processor 202 obtains the location information of the electronic device 102 on a periodic basis and stores the location information in the memory 204. In an example, the location information is received on a periodic basis from the GPS 216, from the neighboring beaconing devices 108A, 108B, or from a combination of the location information obtained from the GPS 216 and the neighboring beacons 108A, 108B.

At 414, the distress event manager 220 retrieves the incident identifier, the phone number of the electronic device 102, the location information of the electronic device 102, and the emergency type identifier from the memory 204. At 416, the distress event manager 220 generates the beacon payload including the retrieved incident identifier, phone number, location information and emergency type identifier.

At 418, the distress event manager 220 determines whether the frequency channels associated with the short-range radio transmitter are engaged in the transmission of other communication payloads. The short radio range transmitter is the BLUETOOTH® radio transmitter 206, the Wi-Fi radio transmitter 208, or an ultrasound radio transmitter.

If the distress event manager 220 determines that the short-range radio transmitter is engaged in the transmission of other communication payloads, the method proceeds to 420. At 420, the distress event manager 220 disables the transmission of the other communication payloads. The method proceeds to 422. If the distress event manager 220 determines that the short-range radio transmitter is not engaged in the transmission of other communication payloads, the method proceeds to 422.

At 422, the distress event manager 220 enables beaconing to transmit the generated beacon payload on the available frequency channels of the short-range radio transmitter to enable responders to locate the electronic device 102 using a responder devices 110. At 424, the processor 102 increases the transmission power supplied to the short-range radio transmitter.

At 426, the distress event manager 220 dynamically updates the beacon payload for the enabled beaconing with refreshed data. In an example, the distress event manager 220 periodically retrieves updated location information from the memory 204 and refreshes the location information of the beacon payload. In an example, the distress event manager 220 periodically retrieves the updated emergency type identifier from the memory 204 and refreshes the emergency type identifier of the beacon payload.

Figure 5:
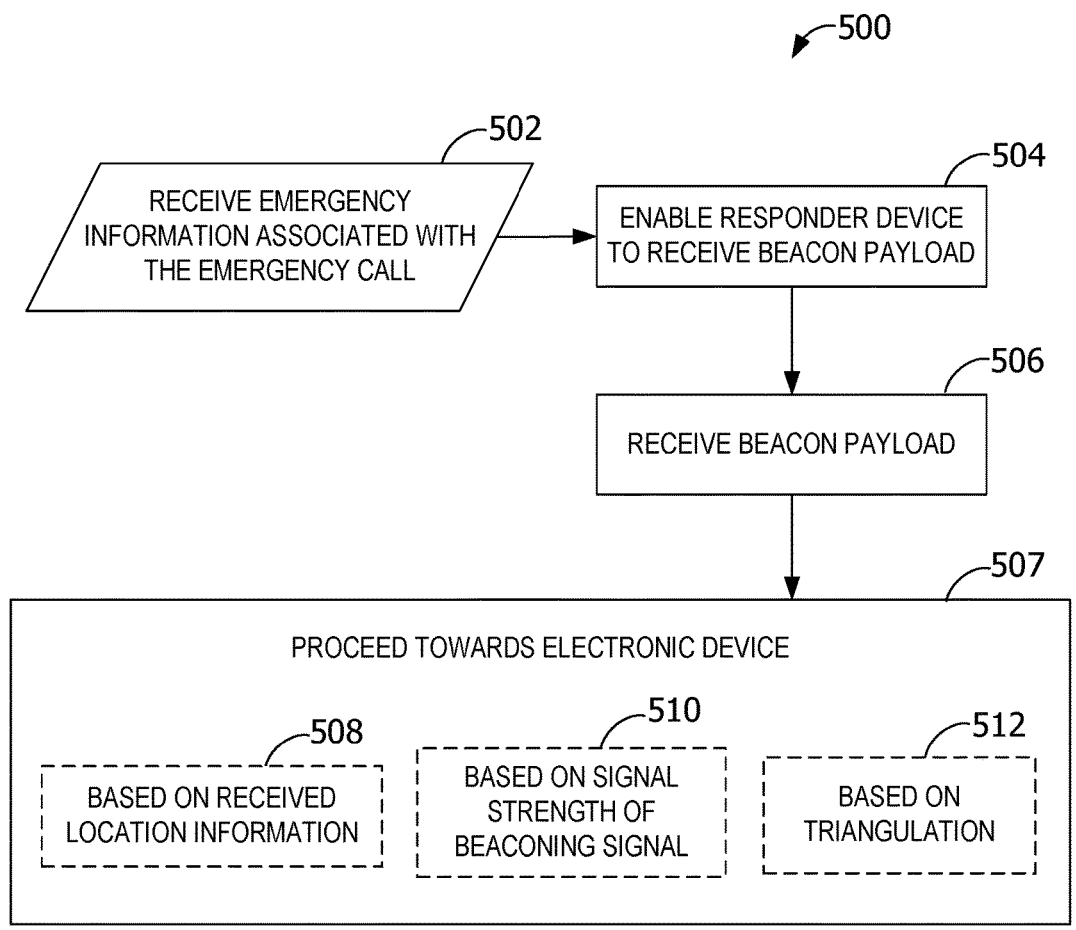
FIG. 5 illustrates a flow chart representation of an exemplary method of locating the electronic device using a responder device.

Referring to FIG. 5 a flow chart representation of an exemplary method 500 of locating an embodiment of the electronic device 102 using a responder device 110 is shown. Each responder carries a responder device 110. At 502, each responder receives emergency information associated with the emergency call received from the user of the electronic device from the emergency service 104 at a responder device 110. The emergency information includes a description of the emergency, the incident identifier associated with the emergency call, the emergency type identifier, the phone number associated with the electronic device 102 that was used to place the emergency call and preliminary location information of the emergency situation. At 504, each responder device 110 is enabled to receive the beaconing payload transmitted by the electronic device 102 that was used to place the emergency call.

At 506, each responder device 110 receives the beacon payload from the electronic device 102. The beacon payload includes the incident identifier, the phone number of the electronic device 102, the location information of the electronic device 102 and the emergency type identifier. The received location information is periodically updated by the electronic device 102 and reflects the current location of the user of the electronic device. The received emergency type identifier is periodically updated to reflect the current emergency type being faced by the user of the electronic device.

At 507, the responders proceed toward the location of the electronic device 102. This may occur at 508 based on the location information embedded in the beacon payload received at the responder devices 110. Alternatively or in addition, at 510, the responders proceed toward the location of the electronic device 102 based on the strength of the beaconing signal received from the electronic device 102 at the responder devices 110. The responders proceed in a direction that indicates an increase in the signal strength of the beaconing signal as detected by the responder devices 110. Alternatively or in addition, at 512, two responder devices 110 in two different locations are used to triangulate the position of the electronic device 102 based on the beaconing signal received from the electronic device 102. Other methods for proceeding towards the location of the electronic device 102 are within the scope of the disclosure.

To reduce false alarms, the responders may attempt to contact the electronic device 102 in an attempt to confirm that the electronic device 102 is truly having an emergency.

Figure 6:
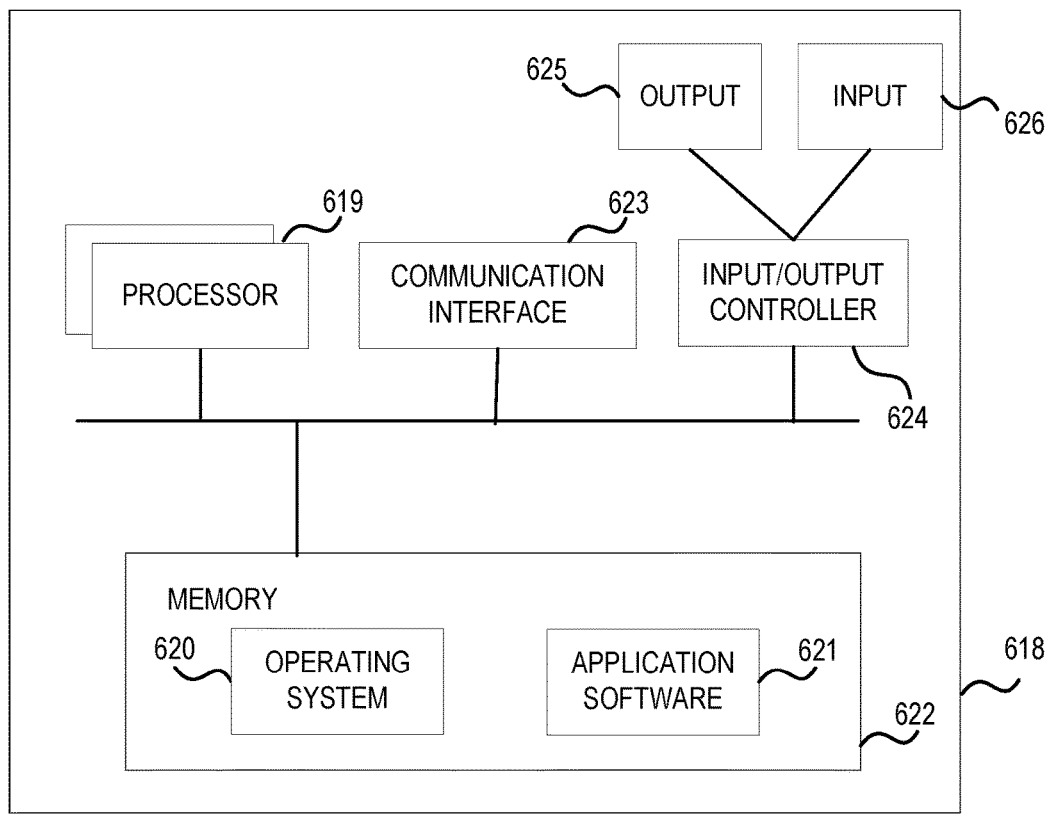
FIG. 6 illustrates a functional block diagram representation of an exemplary computer apparatus.

Referring to FIG. 6, a functional block diagram representation of an exemplary computer apparatus is shown. In an embodiment, components of a computing apparatus 618 may be implemented as a part of an electronic device and/or computing device according to one or more embodiments described in this specification. The computing apparatus 618 comprises one or more processors 619 which may be microprocessors, controllers or any other suitable type of processors for processing computer executable instructions to control the operation of the electronic device. Platform software comprising an operating system 620 or any other suitable platform software may be provided on the computing apparatus 618 to enable application software 621 to be executed on the device.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus 618. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device 625, e.g. a locally connected printing device.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, embedded devices, etc.

Alternatively, or in addition to the other examples described herein, examples include any combination of the following:

An electronic device comprising:
  at least one radio transmitter;
  at least one processor; and
  at least one memory comprising computer program code, the at least one memory and the computer program code configured to, with the at least one processor, cause the electronic device to:
    detect a request to contact an emergency service;
    obtain an incident identifier;
    obtain location information;
    generate a beacon payload including the incident identifier and other data;
    enable beaconing to broadcast the generated beacon payload from the at least one radio transmitter to enable a responder to locate the electronic device; and
    dynamically update the beacon payload for the enabled beaconing with refreshed data.

The electronic device described above, wherein the at least one radio transmitter comprises a short-range radio transmitter including one or more of the following: a BLUETOOTH® radio transmitter, a Wi-Fi radio transmitter, and an ultrasound radio transmitter.

The electronic device described above, wherein the at least one processor causes the electronic device to detect the request to contact the emergency service from a call dialing manager executing on the electronic device.

The electronic device described above, wherein the at least one processor causes the electronic device to receive the incident identifier from one or more of the following: a distress event manager executing on the electronic device, the emergency service via a cellular modem of the electronic device, a component of a cellular network infrastructure via the cellular modem of the electronic device, and a Session Initiation Protocol (SIP) server via the cellular modem of the electronic device.

The electronic device described above, wherein the at least one processor causes the electronic device to collect the location information from one or more of the following: a Global Positioning System (GPS) of the electronic device, and a neighboring beaconing device.

The electronic device described above, wherein the generated beacon payload includes one or more of the following: a phone number associated with the electronic device, an emergency type identifier, the location information of the electronic device, latitude information of the electronic device, longitude information of the electronic device, altitude information of the electronic device and location information of a neighboring beaconing device received at the electronic device.

The electronic device described above, wherein the at least one processor further causes the electronic device to encrypt the location information and include the encrypted location information in the generated beacon payload.

The electronic device described above, wherein the at least one processor causes the electronic device to increase transmission power to the at least one radio transmitter.

The electronic device described above, wherein the at least one processor further causes the electronic device to:
  disable broadcasting of other beaconing payloads associated with the at least one radio transmitter; and
  broadcast the generated beacon payload on available frequency channels associated with the at least one radio transmitter.

The electronic device described above, wherein the refreshed data comprises refreshed location information.

The electronic device described above, wherein the at least one processor causes the electronic device to provide a user interface that provides one or more of the following: an option to cancel the beaconing, and an option to exclude the location information from the generated beacon payload.

The electronic device described above, wherein the at least one processor causes the electronic device to join a mesh network thereby enabling a device within the mesh network to receive the beacon including the beacon payload from the electronic device and to broadcast the beacon from the device to another device in the mesh network.

The electronic device described above, wherein the at least one processor causes the electronic device to:
  maintain a list of neighboring beacons; and
  provide the maintained list of neighboring beacons in response to an interrogation from another device.

A computerized method comprising:
  detecting a request to contact an emergency service;
  obtaining an incident identifier;
  obtaining location information of a mobile device;
  generating a beacon payload including the incident identifier and other data;
  enabling beaconing, at the mobile device, to transmit the generated beacon payload to enable a responder to locate the mobile device; and
  dynamically updating the beacon payload for the enabled beaconing with refreshed data.

The computerized method described above, wherein the generated beacon payload includes one or more of the following: a phone number associated with the mobile device, an emergency type identifier, the location information of the mobile device, latitude information of the electronic device, longitude information of the electronic device, altitude information of the mobile device, and location information of a neighboring beaconing device received at the mobile device.

The computerized method described above, wherein the refreshed data comprises one or more of the following: updated location information received from a Global Positioning System (GPS) of the mobile device, and updated location information received from a neighboring beacon The computerized method described above, further comprising increasing transmission power to the at least one radio transmitter.

One or more computer storage media having computer-executable instructions that, upon execution by a processor, cause the processor to:
  detect a request to contact emergency services;
  obtain an incident identifier;
  obtain location information of a mobile device;
  generate a beacon payload including the incident identifier and other data;
  enable beaconing, at the mobile device, to transmit the generated beacon payload to enable a responder to locate the mobile device; and
  dynamically update the beacon payload for the enabled beaconing with refreshed data.

The one or more computer storage media described above, wherein the generated beacon payload includes one or more of the following: a phone number associated with the mobile device, an emergency type identifier, the location information of the mobile device, latitude information of the mobile device, longitude information of the mobile device, altitude information of the mobile device and location information of a neighboring beaconing device received at the mobile device.

The one or more computer storage media described above, wherein the refreshed data comprises refreshed location information.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An electronic device comprising:
at least one radio transmitter;
at least one processor; and
at least one memory comprising computer program code, the at least one memory and the computer program code configured to, with the at least one processor, cause the electronic device to:
detect a request to contact an emergency service;
obtain an incident identifier for association with the detected request;
obtain location information of the electronic device;
generate a beacon payload including the incident identifier and the location information;
enable beaconing to broadcast the generated beacon payload from the at least one radio transmitter; and
dynamically update the beacon payload for enabled beaconing with refreshed data, the refreshed data including an updated incident identifier that is updated based on an identified emergency situation that is different than an emergency situation corresponding to the request to contact the emergency service.

2. The electronic device of claim 1, wherein the at least one processor causes the electronic device to:
maintain a list of neighboring beacons; and
provide the maintained list of neighboring beacons in response to an interrogation from the responder.

3. The electronic device of claim 1, wherein the at least one processor causes the electronic device to join a mesh network thereby enabling a device within the mesh network to receive the beacon payload from the electronic device and to broadcast the beacon payload from the device to another device in the mesh network.

4. The electronic device of claim 1, wherein the at least one radio transmitter comprises a short-range radio transmitter including one or more of the following: a BLUETOOTH® radio transmitter, a Wi-Fi radio transmitter, and an ultrasound radio transmitter, and the generated beacon payload is broadcast from the at least one radio transmitter directly to one or more responder devices of the responder.

5. The electronic device of claim 1, wherein the at least one processor causes the electronic device to detect the request to contact the emergency service from a call dialing manager executing on the electronic device.

6. The electronic device of claim 1, wherein the updated incident identifier comprises data corresponding to the incident identifier and data corresponding to at least an additional emergency situation identified by responding emergency personnel and to be responded to by a different type of emergency personnel than the emergency personnel responding to the incident identifier, the at least one processor causes the electronic device to receive the updated incident identifier from one or more of the following: a distress event manager executing on the electronic device, the emergency service via a cellular modem of the electronic device, a component of a cellular network infrastructure via the cellular modem of the electronic device, and a Session Initiation Protocol (SIP) server via the cellular modem of the electronic device.

7. The electronic device of claim 1, wherein the at least one processor causes the electronic device to collect the location information from one or more of the following: a global positioning system (GPS) of the electronic device, and a neighboring beaconing device.

8. The electronic device of claim 1, wherein the generated beacon payload includes one or more of the following: a phone number associated with the electronic device, an emergency type identifier, location information of the electronic device, latitude information of the electronic device, longitude information of the electronic device, altitude information of the electronic device and location information of a neighboring beaconing device received at the electronic device.

9. The electronic device of claim 1, wherein the at least one processor further causes the electronic device to encrypt the location information and include the encrypted location information in the generated beacon payload.

10. The electronic device of claim 1, wherein the at least one processor causes the electronic device to increase transmission power to the at least one radio transmitter.

11. The electronic device of claim 1, wherein the at least one processor further causes the electronic device to:
   disable broadcasting of other beaconing payloads associated with the at least one radio transmitter; and
   broadcast the generated beacon payload on available frequency channels associated with the at least one radio transmitter.

12. The electronic device of claim 1, wherein the refreshed data comprises refreshed location information.

13. The electronic device of claim 1, wherein the at least one processor causes the electronic device to provide a user interface that provides one or more of the following: an option to cancel the beaconing to broadcast the generated beacon payload, and an option to exclude the location information from the generated beacon payload.

14. A computerized method comprising:
   detecting a request to contact an emergency service;
   obtaining an incident identifier for association with the detected request;
   obtaining location information of a mobile device;
   generating a beacon payload including the incident identifier and the location information;
   enabling beaconing, at the mobile device, to transmit the generated beacon payload; and
   dynamically updating the beacon payload for enabled beaconing with refreshed data, the refreshed data including an updated incident identifier that is updated based on an identified emergency situation that is different than an emergency situation corresponding to the request to contact the emergency service.

15. The computerized method of claim 14, wherein the generated beacon payload includes one or more of the following: a phone number associated with the mobile device, an emergency type identifier, location information of the mobile device, latitude information of the mobile device, longitude information of the mobile device, altitude information of the mobile device, and location information of a neighboring beaconing device received at the mobile device, and further comprising automatically turning on a beaconing capability with a distress signal after an emergency call is initiated from the mobile device, the beaconing capability comprising a short-wave radio signal representing an advertisement with the distress signal.

16. The computerized method of claim 14, wherein the refreshed data comprises one or more of the following: updated location information received from a Global Positioning System (GPS) of the mobile device, and updated location information received from a neighboring beacon.

17. The computerized method of claim 14, wherein enabling beaconing at the mobile device comprises enabling beaconing from at least one radio transmitter of the mobile device, the computerized method further comprises increasing transmission power supplied to the at least one radio transmitter.

18. One or more computer storage media having computer-executable instructions that, upon execution by a processor, cause the processor to:
   detect a request to contact emergency services;
   obtain an incident identifier;
   obtain location information of a mobile device;
   generate a beacon payload including the incident identifier and other data;
   enable beaconing, at the mobile device, to transmit the generated beacon payload; and
   dynamically update the beacon payload for enabled beaconing with refreshed data, the refreshed data including an updated incident identifier that is updated based on an identified emergency situation that is different than an emergency situation corresponding to the request to contact the emergency services.

19. The one or more computer storage media of claim 18, wherein the generated beacon payload includes one or more of the following: a phone number associated with the mobile device, an emergency type identifier, location information of the mobile device, latitude information of the mobile device, longitude information of the mobile device, altitude information of the mobile device and location information of a neighboring beaconing device received at the mobile device.

20. The one or more computer storage media of claim 18, wherein the refreshed data comprises refreshed location information.

* * * * *